United States Patent
Freytag et al.

[11] 3,925,097
[45] Dec. 9, 1975

[54] STIMULATION OF SUGAR DIFFUSION FROM PLANT TISSUE WITH THE USE OF ETHYLENE, ETHYLENE PRECURSORS, AND ANALOGS

[75] Inventors: Arthur H. Freytag, Longmont; James C. Linden, Loveland, both of Colo.

[73] Assignee: The Great Western Sugar Company, Denver, Colo.

[22] Filed: Nov. 16, 1973

[21] Appl. No.: 416,637

[52] U.S. Cl. .................. 127/44; 127/45; 423/658.5
[51] Int. Cl. .............................................. C13d 1/08
[58] Field of Search ................................ 127/44, 45

[56] References Cited
UNITED STATES PATENTS 2,801,940   8/1957   Stark .................................. 127/44
2,937,958   5/1960   Waterman ........................ 127/44

OTHER PUBLICATIONS

P. W. van der Poel, et al., Sugary Azucar, 53, 26, 27, 45, (Sept., 1958).

*Primary Examiner*—Morris O. Wolk
*Assistant Examiner*—Sidney Marantz
*Attorney, Agent, or Firm*—Bruce G. Klaas, Esq.

[57] ABSTRACT

The pretreatment or treatment of sugar beet cossettes with an effective amount of ethylene increases sugar recovery up to 3 with up to 10 percent increase in purity of sugar. Ethylene treatment has also enabled a 125 percent increase in diffuser speed.

20 Claims, 1 Drawing Figure

SOLUBILITY OF ETHYLENE IN DIFFUSION JUICE AT ELEVATED TEMPERATURES

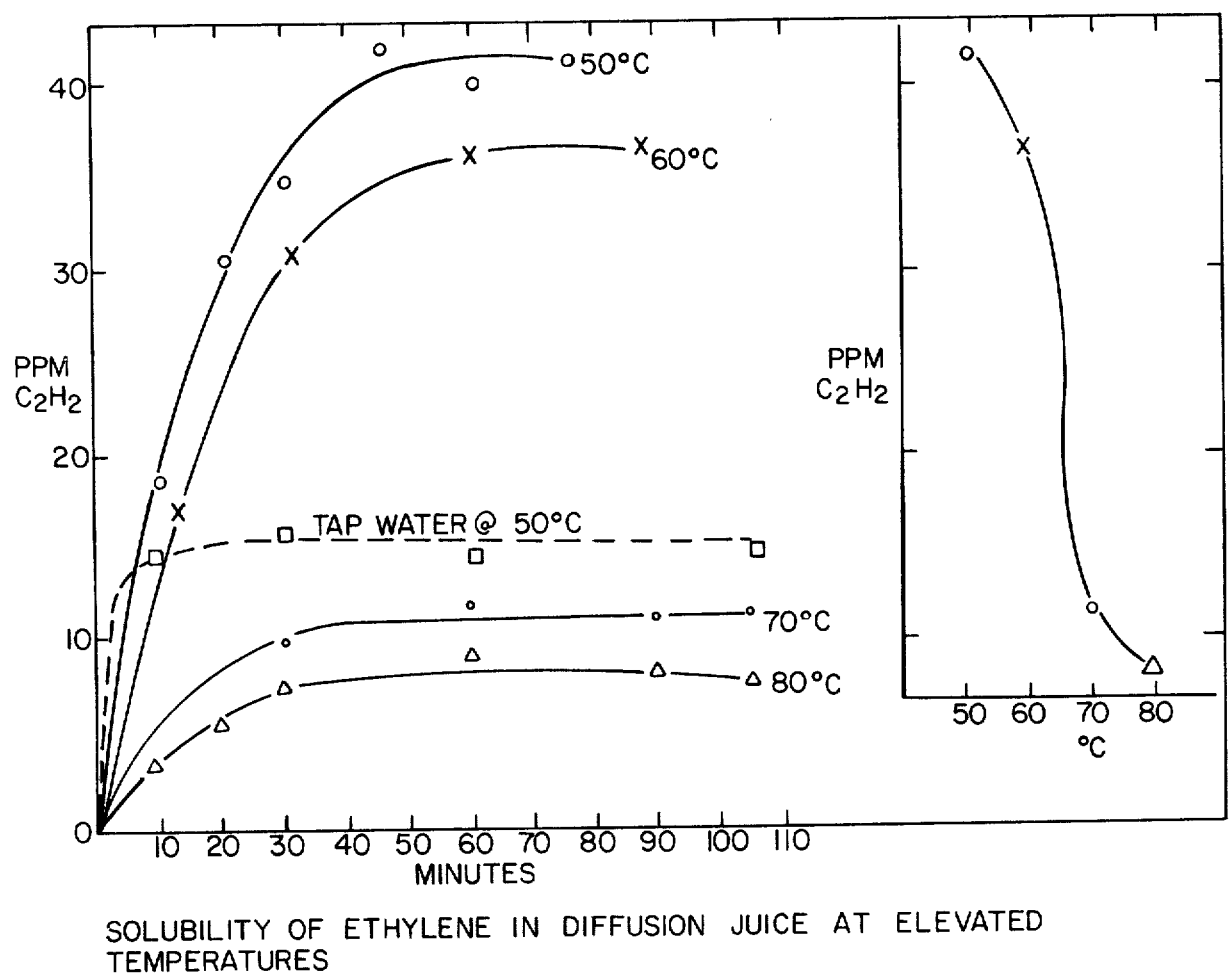
SOLUBILITY OF ETHYLENE IN DIFFUSION JUICE AT ELEVATED TEMPERATURES

STIMULATION OF SUGAR DIFFUSION FROM PLANT TISSUE WITH THE USE OF ETHYLENE, ETHYLENE PRECURSORS, AND ANALOGS

BACKGROUND OF THE INVENTION

In conventional sugar manufacture, such as processing sugar beets, the fresh beets are washed and sliced into long narrow strips called "cossettes." These cossettes are placed in large tanks with as many as twelve to fourteen being connected in series to form a "diffusion battery." Sugar is extracted from the beets in such diffusers with a counter current stream of hot water. The dark colored solution from the diffuser containing the extracted sucrose is treated with various reagents such as lime, carbon dioxide, sulphur dioxide and decolorizing carbon in order to remove some of the impurities from the solution. The solution is then filtered and concentrated in multiple effect evaporators and then crystallized in vacuum pans.

In the extraction of sugar and the like from plant tissues, it is desirable to obtain the maximum recovery of the sugar content with good purity and within a reasonable period of time. To this end, considerable research has been conducted to find chemical agents which can be used to increase the permeability of the membranes of plants. Ethylene has received attention as a potentially useful agent for this purpose and although some of the prior art findings of the effects of treating plant tissue with ethylene are interesting from a scientific point of view, they have not had any commercial success.

In one prior art work a study was made on the effects of ethylene on permeability in tissue sections from avocado and both pulp and peel of banana and the beans and leaves of Kentucky Wonder Pole beans. Ethylene had no effect on permeability in four of the five tissues tested, but sometimes enhanced solute uptake in banana peel. Another worker suggests that changes in the characteristics of membranes treated with ethylene are a result of ripening rather than a cause. Still another worker appears to have found that the effect of ethylene in the presence of potassium chloride solution increased the permeability of hypoprotein membranes; however, in the presence of sucrose, there appeared to be an inhibiting effect on increased permeability of the membrane.

SUMMARY OF INVENTION

This invention is based upon the discovery that the pretreatment or treatment of sugar containing plants with ethylene produces unexpected and novel improvement in the extraction of sugar therefrom of increased purity. Further, such treatment or pretreatment of the plants has enabled an increase in diffuser speed over that where the plants are untreated. For example, it has been found that the treatment or pretreatment of a sugar plant tissue with effective amounts of ethylene, i.e., sufficient to increase extraction efficiency, whether the treatment or pretreatment of the plant be as dry, wet or scalded plants, provides a significant increase in extraction efficiency and purity of diffusion juice over untreated sugar plant tissue.

The stimulation of sugar diffusion is accomplished by the treatment or pretreatment of a sugar plant tissue by contacting same with ethylene at the rate of at least about 0.06 cc ethylene per minute per gram of plant tissue treated. The plant tissues may be treated either dry, wet or scalded. The cossettes are freshly cut and treated with ethylene before introduction into the diffusion water and ethylene is bubbled or purged into the water.

DESCRIPTION OF THE DRAWING

The FIGURE is a graphical representation of the solubility of ethylene in diffusion juice at elevated temperatures.

DESCRIPTION OF THE PREFERRED EMBODIMENTS

Plants which may be treated with ethylene to stimulate diffusion of sugar therefrom include as sugar plants, sugar beets, sugar cane sugar maize, sugar sorghum and possibly other less abundant sources of sugar.

The sugar containing tissues of the plant, i.e, the enlarged root of the sugar beet is washed to remove excess soil and sliced into cossettes. In each case a 500 gram sample of fresh sliced sugar beet cossettes were placed in 500 ml of tap water in 3000 ml containers. Ethylene gas was bubbled or purged into the water and the cossettes were treated with ethylene before they entered the water.

The cossettes may be treated with ethylene either dry, wet or scalded as by contact with boiling hot water before being introduced into the diffusion water.

The ethylene is introduced in an amount sufficient to increase the diffusion of sugar from plant tissue over that obtained by agitation of the diffusion water or where the water is purged with nitrogen gas. The amount of ethylene will generally be introduced at the rate equivalent to at least 0.06 cc of ethylene as a gas per minute per gram of plant tissue treated. Greater amounts of ethylene may be used with increased diffusion with as much as 3.6 cc ethylene per minute per gram of plant tissue providing an even higher diffusion rate.

Although this invention is described as treating and pretreating of sugar plant tissue with gaseous ethylene it is to be understood that other means for carrying out the invention will be obvious to those skilled in the art. Thus, in addition to gaseous ethylene, aqueous compounds of ethylene, ethylene precursors and analogs which yield the desired quantity of ethylene may similarly be used. An ethylene precursor or analog is any chemical compound which would itself evolve ethylene or induce the cell or plant tissue to give off ethylene. Such compounds include solid and liquid materials such as N-amino-B-alanine, B hydroxyethylhydrazine, sodium monoethylsulfate, methionine and 2-chloroethyl-phosphonic acid.

Apparatus suitable to carry out the method of this invention will be readily apparent to one skilled in the art. While the bench study tests here reported were static, dynamic tests were also conducted in a pilot plant diffusor under factory conditions. A pilot plant slope diffuser was used with a capacity of 20 pounds per hour of beet cossettes. The diffuser was equipped with temperature controls, and provided with variable feed and scroll rates. Ethylene was supplied to the diffuser supply in addition to two bubbling ports in the body. The beet cossettes are moved through the diffuser countercurrent to the diffusion water. Compared to controls the treatment and pretreatment of the cossettes with ethylene enabled complete diffusion thereof in less than 50 percent of the time and also at lower temperatures, yielded a higher purity diffusion juice under similar conditions and further yielded a higher total extraction because of higher sugar content in the pulp press juice.

BENCH STUDIES

Fresh sliced sugar beet cossettes were obtained from the factory and for all tests, 500 grams of cossettes were placed in 500 ml of tap water in 3000 ml containers. Ethylene gas was bubbled or purged into the water and the beet cossettes were treated with ethylene before they entered the water.

The results in Table 1 shows that there is some increase in sugar extraction over the control by purging with nitrogen gas which apparently is due solely to the water being agitated. The results also show ethylene purging produces extraction of sugar which is superior to either control or nitrogen purging at ambient temperature of 24°C. and elevated temperature, 70°C.

The data in Table 2 shows the effect of concentration of ethylene on the sugar extraction at temperatures of 24°C. and 70°C. The flow rates of ethylene illustrated are 0.09, 0.3, 0.6 and 1.8 liters per minute. With an ethylene flow rate of 0.09 liters per minute there is little or no increase in sugar extraction. At the intermediate flow rates of 0.3 and 0.6 liters per minute of ethylene it appears that the sugar extraction stimulation is about equal but greater than the lower rate. At the higher flow rate of 1.8 liters per minute of ethylene the stimulation is much higher than with the lower flow rates. Since in each case the cossettes treated amount to 500 grams the flow rates of 0.09, 0.3, 0.6 and 1.8 liters per minute comprise respectively 0.18, 0.6, 1.2 and 3.6 cc per minute per gram of sugar beet cossettes treated.

Thus, it would appear that the ethylene flow rate should be in an amount sufficient to at least provide a concentration in the diffusion water of 0.03 ppm ethylene. For the best results the concentration should preferably be about 0.10 ppm ethylene. The percentage increase of sugar diffusion at higher temperatures is consistently less than at lower temperatures with ethylene stimulation because at the higher temperatures there is a greater disruption of cells, faster killing with time and the sugar is more soluble. One of the advantages of the instant process is that the ethylene diffusion process permits operation at lower temperatures with increased recovery of sugar. This, of course, results in greater operating economy plus obtaining a higher quality product due to cell constituents other than sugar not moving out of the cell as rapidly with the extracted sugar which enhances purity.

TABLE 1

Effect of Gas Purging on Sugar Diffusion

| Water Temperature 24° C. Time In Minutes | Control (No Purge) | 0.6 l/min. Ethylene Purge | Nitrogen Purge | 0.6 l/min. Ethylene Purge | Nitrogen Purge | 0.6 l/min. Ethylene Purge |
|---|---|---|---|---|---|---|
| 5 | 5.5 | 14.5 | 13.0 | 14.8 | 15.0 | 16.8 |
| 10 | 6.8 | 16.3 | 14.3 | 15.7 | 16.0 | 17.9 |
| 15 | 15.5 | 17.4 | 15.6 | 17.0 | 16.9 | 18.3 |
| 30 | 16.0 | 18.4 | 16.4 | 17.8 | 18.0 | 19.8 |
| 60 | | | | | 19.0 | 20.7 |
| Water Temperature 70° C | | | | | | |
| 5 | 19.7 | 23.0 | 18.5 | 20.0 | 21.0 | 22.8 |
| 10 | 28.2 | 29.2 | 24.5 | 26.0 | 28.0 | 28.7 |
| 15 | 32.0 | 33.0 | 31.0 | 32.7 | 32.0 | 33.5 |
| 30 | 34.4 | 35.4 | 37.0 | 38.3 | 35.0 | 36.1 |
| 60 | 34.9 | 38.0 | | | 36.0 | 38.0 |

All numbers are grams of sucrose per liter.

TABLE 2

Effect of Ethylene Flow Rate on Sugar Diffusion

| Water Temperature 24° C. Time In Minutes | Control No Purge | Ethylene 0.09 l/min. | Control No Purge | Ethylene 0.3 l/min. | Control No Purge | Ethylene 0.6 l/min. | Control No Purge | Ethylene 1.8 l/min. |
|---|---|---|---|---|---|---|---|---|
| 5 | 9.0 | 14.0 | 9.0 | 14.9 | 8.2 | 13.5 | 11.5 | 16.0 |
| 10 | 13.8 | 15.0 | 13.5 | 16.5 | 12.0 | 16.0 | 13.5 | 19.8 |
| 15 | 16.5 | 18.2 | 14.7 | 18.4 | 13.5 | 17.8 | 16.3 | 23.0 |
| 30 | 20.2 | 20.8 | 18.7 | 21.2 | 17.5 | 19.9 | 22.3 | 26.2 |
| 60 | 21.8 | 21.5 | 20.0 | 22.6 | 19.3 | 21.3 | 23.4 | 27.7 |
| Water Temperature 70° C. | | | | | | | | |
| 5 | 18.5 | 19.5 | 19.0 | 26.2 | 18.8 | 23.0 | 16.0 | 18.6 |
| 10 | 23.0 | 23.0 | 24.3 | 30.0 | 28.0 | 29.2 | 21.2 | 25.7 |
| 15 | 27.8 | 28.0 | 30.2 | 33.6 | 32.0 | 33.2 | 27.2 | 31.6 |
| 30 | 31.0 | 30.4 | 36.5 | 38.3 | 34.4 | 35.3 | 32.1 | 36.0 |
| 60 | 32.4 | 31.8 | 36.8 | 38.5 | 34.6 | 38.0 | 32.7 | 36.8 |

All numbers are grams of sucrose per liter.

Diffusion through the cell membranes of sugar beets does not take place through the cell walls of living cells, but occurs only after the beet cells have been killed by appropriate physical or chemical treatment. This may be accomplished by contact with certain chemicals or by physical action such as heating. Prior art workers have found that at a temperature of 60°C., the killing of beet cells required 60 minutes as against 5 minutes at 80°C. Cell killing is reported to occur at a temperature as low as 57°C., but the time required is 80 to 90 minutes.

The data in Table 3 shows the effect of ethylene pretreatment on sugar beet cossettes and that ethylene stimulates sugar extraction.

The mechanism by which ethylene is able to improve the extraction of sugar from plant tissue is thought to be the apparent ability of ethylene to change cell wall and membrane permeability. A study was conducted on cell permeability with the results being shown in Table 4. Cork bore plugs were cut from a sugar beet and ten such plugs, each weighing 1 gram, were treated for 15 minutes in an ethylene atmosphere while the control plugs were treated with air. The plugs of each treatment were then placed in 40 ml of distilled water and removed for weighing at intervals of 5, 10, 20, 45, 60, 75 and 90 minutes to measure the increase in weight due to absorbed water. The cores in one case were dry and the other wet when contacted with ethylene.

PILOT PLANT TESTS

The experiments of Table 6 were conducted using a pilot plant slope diffuser having a capacity of 20 pounds per hour of sugar beet cossettes. The pilot plant diffuser had appropriate temperature controls and was provided with variable feed controls and scroll rates. With this unit, factory operating conditions can be attained. Ethylene was supplied to the diffuser supply in addition to two bubbling ports in the body. The ethylene treated samples when compared to the controls enabled complete diffusion in one half the time required

TABLE 3

Effect of Ethylene Pretreatment on Sugar Beet Cossettes
Water Temperature 50° C.

| Time In Minutes | Control | Ethylene Dry Treated | Control | Ethylene Wet Treated | Control | Ethylene Scald Treated |
|---|---|---|---|---|---|---|
| 5 | 13.8 | 14.3 | 9.0 | 9.8 | 12.6 | 14.0 |
| 10 | 18.7 | 19.7 | 13.2 | 14.5 | 16.6 | 18.2 |
| 15 | 22.5 | 23.9 | 15.8 | 16.9 | 20.4 | 22.9 |
| 20 | 25.4 | 26.9 | 17.8 | 19.5 | 23.3 | 25.9 |
| 30 | 28.3 | 29.5 | 20.5 | 22.2 | 27.1 | 29.1 |
| 60 | 33.5 | 34.5 | 27.7 | 29.8 | 30.0 | 30.9 |

All numbers are grams of sucrose per liter.

TABLE 4

Effect of Ethylene on Water Uptake (Cell Permeability) on 1 Gram Core Samples of Sugar Beets
Weight in Grams

| Time In Minutes | Control | Ethylene Wet Treated | Control | Ethylene Dry Treated |
|---|---|---|---|---|
| 10 | 3.4 | 9.7 | 5.6 | 2.1 |
| 20 | 4.5 | 9.7 | 6.0 | 3.3 |
| 45 | 5.2 | 10.7 | 7.0 | 5.1 |
| 60 | 6.1 | 11.5 | 8.1 | 6.8 |
| 75 | 6.3 | 12.9 | 9.6 | 7.2 |

Mean of both tests

The pulp press juice sugar content in diffusion tests consistently were higher from sugar beet cossettes which were ethylene treated than the control. To confirm this, two tests were conducted. Pulp from a factory was obtained from which the principal sugar content had been diffused. Equal weight samples of 500 grams each were used, one being treated with ethylene and the other used as a control. The pulp was placed in a plastic bag and treated with ethylene for 15 minutes. The pressing and analysis were identical for both treatments and all analysis was performed in the accepted manner of the industry. The ethylene treated sample had more pulp press juice, higher pulp press juice sugar and less sugar remaining in the pulp than the untreated control. Table 5 shows the results of these tests.

for complete diffusion of the controls. Also, the complete diffusion of the ethylene treated samples was accomplished at lower temperatures, yielded a higher purity diffusion juice under similar operating conditions and yielded a higher total extraction as evidenced by a higher sugar content in the pulp press juice. In samples 3, 5, 8, and 10–13, ethylene was introduced into the diffuser to provide a flow rate of from about 5 to 8 liters per minute. The cossettes were not pretreated with ethylene before introduction into the diffuser which had a capacity of about 20 pounds of beet cossettes per hour. The ethylene concentration in the diffuser was varied from about 5 to 8 liters per minute to provide about 0.5 cc per minute per gram of plant tissue to about 0.9 cc per minute per gram of plant tissue. There does not appear to be an upper limit to the ethylene concentration.

TABLE 5

| Treatment | Effect of Ethylene on Pulp Press Juice and Pulp ml. of Juice From 500g of Pulp | Percent Sugar in Pulp Press Juice | Percent Sugar Left in Pulp |
|---|---|---|---|
| TEST 1 | | | |
| Ethylene | 72 | 0.9096 | 0.70 |
| Control | 63 | 0.8778 | 0.80 |
| TEST 2 | | | |
| Ethylene | 79 | 0.9574 | 0.72 |
| Control | 71 | 0.8791 | 0.82 |
| MEAN OF TESTS 1 AND 2 | | | |
| Ethylene | 76 | 0.9335 | 0.71 |
| Control | 67 | 0.8784 | 0.81 |

The results in Tables 6 and 7 demonstrate the reproducibility of obtaining higher sugar content diffusion juices when ethylene is bubbled into the pilot plant diffuser. A bonus is obtained in the form of higher purities. An increased rate of diffusion of sugar from sugar beet tissue is found when ethylene is present. The effective ethylene concentration in the diffusion juice is on the order of about 0.03 ppm to about 0.21 ppm with a preferred concentration of about 0.10 ppm.

While it is not known precisely how the presence of ethylene increases the efficiency of diffusion apparently ethylene does affect cell permeability. The solubility of ethylene in lipids of the cell membrane may induce changes in the distribution of the lipids, pores and enzymes of the cell membrane. There is also evidence that ethylene increases the activity of various membrane bound enzymes including ATPase, polyphenol oxidase and peroxidase.

Ethylene carries a reactive double bond between the two carbon atoms. Acid catalyzed hydration reactions yield ethanol under conditions of the diffuser, but it is doubtful that the small quantity formed in this way is effective in the extraction of sugar. Carbon dioxide is formed by the oxidation of ethylene with atmospheric oxygen. Acid addition reactions may occur with the myriad of functional groups in cell membranes. The presence of many reactive, solubilizing or complexing factors for ethylene in diffusion juice increases its solubility therein over than in water. This is evidenced by the data depicted in the FIGURE. Also there is shown in the FIGURE that the solubility of ethylene in diffusion juice varies inversely with temperature.

In earlier tests of Table 6, 1 and 2, it was learned that the same sugar content of diffusion juice was obtained by normal retention times in both control and ethylene treatment samples. In later tests, 3–9, by doubling the rate of scroll rotation and lowering the temperature of the diffuser, more sugar was extracted when ethylene was applied. Bubbling of nitrogen in sample 6 did not increase the sugar extraction, but the application of ethylene in sample 7 raised the sugar content of the diffusion juice by 0.5 percent. Similar results were obtained in sample 9 at higher draft and lower temperature.

The pulp losses in the samples of Table 6 were high because of incomplete dewatering of the pulp due to a higher than necessary water level in the diffuser. The purities of the diffusion juices and the thin juices did not vary significantly from that of the control with ethylene application. No specificity was noted in extracting invert and raffinose with ethylene.

In Table 7 are tabulated the analytical data from the treatment of additional samples in the pilot plant diffuser. The several samples were treated under near identical conditions and the statistical significance of the results could be tested by the T test as follows:

| Result of Ethylene Treatment | Difference | Statistical Significance |
|---|---|---|
| Increase in D.J. sugar content | 0.8% sugar | 2.5% |
| Increase in D.J. apparent purity | 2.3 pur. units | 15.0% |
| Increase of D.J. pH value | 0.4 pH unit | 1.0% |
| GLC true purity of T.J. | | none |
| Decrease in T.J. raffinose content | 18.5% diff. | 10.0% |
| Decrease in T.J. invert content | 53.0% diff. | 2.5% |
| Sodium content of T.J. | | none |
| Potassium content of T.J. | | none |

TABLE 6

| No. | Sample | Retention Time (Mins) | Draft | Average Temperature (°C) | Diffusion Juice % Sugar | Diffusion Juice App. Purity | Thin Juice Double Acid True Purity | Diffusion Juice Invert mg/100 RDS | Diff. Juice Raffinose mg/100 RDS | Press Juice % Sugar |
|---|---|---|---|---|---|---|---|---|---|---|
| 1 | Control | 70 | 100 | 77 | 12.7 | 78.9 | 94.78 | 20.72 | 4.48 | 5.9 |
| 2 | Ethylene | 60 | 100 | 77 | 12.7 | 79.1 | 92.01 | 30.57 | 4.42 | 5.0 |
| 3 | Control | 40 | 100 | 65 | 9.7 | 86.5 | 93.42 | 27.53 | 5.74 | 2.6 |
| 4 | Ethylene | 30 | 100 | 69 | 12.1 | 89.7 | 92.67 | 25.19 | 4.35 | 4.4 |
| 5 | Control | 40 | 100 | 71 | 12.4 | 89.2 | 92.93 | 42.49 | 3.55 | 4.1 |
| 6 | Nitrogen | 40 | 100 | 72 | 12.3 | | | | | |
| 7 | Ethylene | 30 | 100 | 72 | 12.9 | 90.8 | 93.20 | 37.04 | 3.63 | 5.6 |
| 8 | Control | 40 | 138 | 67 | 11.5 | 90.8 | 92.70 | 19.06 | 4.11 | 4.6 |
| 9 | Ethylene | 30 | 138 | 66 | 12.0 | 88.3 | 92.99 | 24.75 | 5.04 | 3.2 |

TABLE 7

| No. | Sample | Retention Time (Minutes) | Draft | Average Temperature (°C) | Diffusion Juice % Sugar | Diffusion Juice pH | Diffusion Juice App. Purity | Thin Juice GLC True Purity | Thin Juice Invert mg/100 RDS | Thin Juice Raffinose mg/100 RDS |
|---|---|---|---|---|---|---|---|---|---|---|
| 1 | Control | 50 | 176 | 69 | 8.55 | 6.3 | 86.1 | 89.61 | 41.0 | 167.9 |
| 2 | Control | 50 | 156 | 74 | 8.60 | 6.0 | 86.0 | 92.12 | 27.4 | 132.3 |
| 3 | Control | 50 | 161 | 70 | 7.59 | 5.8 | 85.4 | 92.31 | 46.6 | 79.4 |
| 4 | Control | 50 | 169 | 66 | 7.97 | 6.0 | 82.8 | 96.14 | 35.7 | 94.0 |
| | Mean | 50 | 165 | 70 | 8.18 | 6.0 | 85.1 | 92.54 | 37.7 | 118.4 |
| 5 | 1.0 l/min | 45 | 165 | 72 | 8.97 | 6.4 | 87.0 | 91.98 | 15.7 | 114.0 |
| 6 | 0.5 l/min | 45 | 161 | 69 | 8.67 | 6.4 | 83.3 | 92.14 | 20.1 | 114.3 |
| 7 | 0.25 l/min | 45 | 160 | 70 | 8.97 | 6.4. | 90.7 | 90.12 | 33.0 | 80.0 |
| 8 | 0.1 l/min | 45 | 162 | 73 | 9.30 | 6.4 | 88.6 | — | 2.3 | 77.6 |
| | Mean | 45 | 162 | 71 | 8.98 | 6.4 | 87.4 | 91.41 | 17.8 | 96.5 |
| 9 | Cold Pretrt. | 50 | 168 | 63 | 8.64 | 6.3 | 83.9 | | 22.0 | 211 |
| 10 | Cold Pretrt. | 50 | 164 | 65 | 7.24 | 6.0 | 76.2 | | 42.9 | 196 |
| | Mean | 50 | 166 | 64 | 7.94 | 6.1 | 80.0 | | 32.5 | 204 |
| 11 | Control | 50 | 145 | 68 | 8.55 | 5.8 | 89.2 | 86.40 | 69.5 | 329.1 |
| 12 | Cold Pretrt. | 50 | 147 | 67 | 9.65 | 6.2 | 78.8 | 88.59 | 50.9 | 120.9 |
| 13 | Scald | | | | | | | | | |
| 14 | Control | 55 | 155 | 71 | 8.53 | 5.3 | 85.5 | | 74.1 | 105 |
| 15 | Scald | | | | | | | | | |
| 16 | Pretrt. | 55 | 158 | 66 | 8.62 | 5.4 | 82.5 | | 59.3 | 73 |
| 17 | Scald | | | | | | | | | |
| 18 | Control | 55 | 173 | 66 | 7.85 | 6.3 | 84.4 | | 23.1 | 125 |

TABLE 7-continued

| No. | Sample | Retention Time (Minutes) | Draft | Average Temperature (°C.) | Diffusion Juice % Sugar | Diffusion Juice pH | Diffusion Juice App. Purity | Thin Juice GLC True Purity | Thin Juice Invert mg/100 RDS | Thin Juice Raffinose mg/100 RDS |
|---|---|---|---|---|---|---|---|---|---|---|
| 19 | Scald | | | | | | | | | |
| 20 | Pretrt. | 55 | 176 | 65 | 7.96 | 5.7 | 82.5 | | 25.5 | 85 |

Amino nitrogen content of T.J.   none
Pressed pulp moisture content   none
Pulp losses   none
Pulp press water sugar content   none The rate of ethylene application in the pilot plant treated samples. Unaccountability is undoubtedly due to experimental error but the higher sugar extraction with ethylene is due to the difference in diffusion juice purities. The mean difference between ethylene treated samples and control samples in diffusion juice sugar content is 0.20 pounds sugar per hour or 1 percent greater when calculated on beets introduced.

TABLE 8

SUGAR BALANCE

| No. | Liters $C_2H_4$ per Minute | Diffusion Juice | | | Press Pulp Water | | | Pulp Losses | | | Total Out Lbs. Sugar/ Hour | Total In Lbs. Sugar/ Hour |
|---|---|---|---|---|---|---|---|---|---|---|---|---|
| | | % Sugar | Avg. Lbs./ Hour | Lbs. Sugar/ Hour | % Sugar | Avg. Lbs./ Hour | Lbs. Sugar/ Hour | % on Beets | Lbs. Sugar/ Hour | Lbs. Sugar/ Hour | | |
| 1 | 0 | 8.55 | 35.2 | 3.01 | 0.99 | 9.0 | 0.09 | 0.351 | 0.07 | 3.17 | | |
| 2 | 0 | 8.60 | 31.2 | 2.68 | 0.56 | 8.2 | 0.05 | 0.263 | 0.05 | 2.78 | | |
| 3 | 0 | 7.59 | 32.2 | 2.44 | 1.06 | 9.8 | 0.10 | 0.404 | 0.08 | 2.62 | | |
| 4 | 0 | 7.97 | 33.8 | 2.69 | 0.47 | 9.8 | 0.05 | 0.147 | 0.03 | 2.77 | | |
| | Mean | 8.18 | 33.1 | 2.71 | 0.77 | 9.2 | 0.07 | 0.291 | 0.06 | 2.84 | | |
| 5 | 1.0 | 8.97 | 33.0 | 2.96 | 0.70 | 6.0 | 0.04 | 0.279 | 0.06 | 3.06 | | |
| 6 | 0.5 | 8.67 | 32.2 | 2.79 | 1.10 | 9.6 | 0.10 | 0.365 | 0.07 | 2.96 | | |
| 7 | 0.25 | 8.97 | 32.0 | 2.87 | 0.59 | 9.8 | 0.06 | 0.213 | 0.04 | 2.97 | | |
| 8 | 0.1 | 9.30 | 32.4 | 3.01 | 0.97 | 8.8 | 0.08 | 0.342 | 0.07 | 3.16 | | |
| | Mean | 8.98 | 32.4 | 2.91 | 0.84 | 8.5 | 0.07 | 0.299 | 0.06 | 3.04 | | |
| 9 | Cossettes % Sugar = | 16.92 | | | | | | | | | | 3.38 |
| 10 | Cossettes % Sugar = | 16.58 | | | | | | | | | | 3.32 |
| | Mean | 16.75 | | | | | | | | | | 3.35 | equipment from the slowest possible rate to the fastest possible rate did not change the effectiveness of ethylene in increasing sugar extraction. A threshold level of effective ethylene of the application of at least 0.6 cc ethylene per minute per gram of plant tissue and preferably the application of at least 3.6 cc ethylene per minute per gram of plant tissue.

The residual ethylene in diffusion juices from 1.0, 0.5, 0.25 and 0.1 liters per minute applications of ethylene was 0.14, 0.21, 0.13 and 0.03 ppm respectively. The concentration of ethylene in diffusion juice apparently should be at least about 0.03 ppm and preferably at least about 0.1 ppm of ethylene.

The retention time in the pilot plant diffuser for the ethylene treated samples was shorter than the controls because the ethylene bubbles helped carry the cossettes along. The diffusion constants calculated from the mean of four samples, each by the Silin equation were $6.82 \times 10^{-5}$ and $7.70 \times 10^{-5}$ for controls and ethylene respectively. Increased diffusion results in a larger value for the diffusion constant. The rate of scroll rotation was again twice the normal rate and the consequent shorter retention time apparently improved the purity of the diffusion juice particularly when ethylene was used.

Ethylene apparently exerts some buffering capacity on diffusion juice. Values of pH 6.4 were found in diffusion juice whenever ethylene was used, whereas lower values were always obtained in the controls.

Table 8 gives the sugar balance for the pilot plant tests reported in Table 7. Approximately 15 percent of the sugar is unaccountable in the mean of form control samples and 9 percent is unaccountable in ethylene

What is claimed is:

1. A method of stimulating sugar diffusion from plant tissues containing sugar selected from the group consisting of sugar beets, sugar cane, sugar maize and sugar sorghum which comprises contacting the plant tissues with diffusion water in the presence of ethylene.

2. The method of claim 1 wherein ethylene gas is bubbled through the diffusion water in contact with the plant tissue.

3. The method of claim 1 wherein the ethylene is present in an amount effective to increase sugar extraction efficiency.

4. The method of claim 1 wherein the ethylene is present in the diffusion water in an amount on the order of at least about 0.03 ppm ethylene.

5. The method of claim 1 wherein the ethylene is present in the diffusion water in an amount on the order of from about 0.03 ppm to about 0.21 ppm ethylene.

6. The method of claim 1 wherein the ethylene is present in the diffusion water in an amount of at least about 0.10 ppm ethylene.

7. The method of claim 1 wherein the ethylene is present in an amount equivalent to at least about 0.06 cc ethylene per minute per gram of plant tissue.

8. The method of claim 1 wherein the ethylene is present in an amount equivalent to at least about 0.6 cc ethylene per minute per gram plant tissue.

9. The method of claim 1 wherein the plant tissues are pretreated with ethylene prior to contact with diffusion water.

10. The method of claim 1 wherein the diffusion water is maintained at a temperature of not more than about 80°C.

11. A method of treating sugar beets to increase the amount and purity of sugar recovered therefrom in a diffuser which comprises the steps of passing sugar beet cossettes through a diffuser countercurrent to diffusion water and introducing ethylene into the diffuser.

12. The method of claim 11 wherein the ethylene is bubbled into the diffusion water.

13. The method of claim 11 wherein the cossettes are pretreated with ethylene before introduction into the diffuser.

14. The method of claim 11 wherein the ethylene is present in an amount effective to increase sugar extraction efficiency.

15. The method of claim 11 wherein the ethylene is present in the diffusion water in an amount on the order of at least about 0.03 ppm ethylene.

16. The method of claim 11 wherein the ethylene is present in the diffusion water in an amount on the order of from about 0.03 ppm to 0.21 ppm ethylene.

17. The method of claim 11 wherein the ethylene is present in the diffusion water in an amount of at least about 0.10 ppm ethylene.

18. The method of claim 11 wherein the ethylene is introduced into the diffuser at a rate of at least about 0.06 cc ethylene per minute per gram of sugar beets in the diffuser.

19. The method of claim 11 wherein the ethylene is introduced into the diffuser at a rate of at least about 0.6 cc ethylene per minute per gram of sugar beets in the diffuser.

20. The method of claim 11 wherein the diffusion water is maintained at a temperature of not greater than about 80°C.

* * * * *